UNITED STATES PATENT OFFICE.

DANIEL F. PACKER, OF READING, CONNECTICUT.

IMPROVED SOAP.

Specification forming part of Letters Patent No. 46,817, dated March 14, 1865.

*To all whom it may concern:*

Be it known that I, DANIEL F. PACKER, of Reading, in the county of Fairfield and State of Connecticut, have invented a new and Improved Soap; and I do hereby declare that the following is a full, clear, and exact description of the same.

This invention, which I term "Packer's National Soap," consists in a new and useful improvement in the composition of a soap for cleansing purposes, and which can be used with advantage in the laundry and for all other domestic purposes, and also in factories where goods are to be cleansed on a large scale, and which can also be used in removing stains from wood and other surfaces which are painted or varnished without at all affecting the paint or varnish.

The following is my specification and description of the process of composition of my soap, and of the ingredients thereof, and of the quantities of the several ingredients:

I put into a kettle forty pounds of water, one pound of Glauber's salt, three pounds of fresh-burnt lime, one-half of a pound of alum, and six pounds of crystal sal-soda. The sal-soda should be that known as "English," or of a quality equally as good, or nearly as good. These ingredients are then subjected to heat and brought to a boil. The boiling is continued for about five minutes. The fire is then drawn from under the kettle and the kettle and contents are allowed to stand for about one hour. The product is a lye which I call "refined caustic lye," with which I saponify the tallow or other grease, as hereinafter set forth. After the lye thus produced has stood about one hour it is ready for use. I draw about eighteen pounds of the clear lye from the kettle and put the same into another kettle and add six pounds of tallow, oil, grease, or other equivalents, and boil them together for about the space of one hour and twenty minutes. I then draw the fire and allow the contents of the kettle to repose for about one hour, or until the said contents have cooled down to the temperature of 170° Fahrenheit, or thereabout, when I heat the said contents again, so as to bring them to a gentle boil, at which they are kept for about fifteen minutes. I then increase the heat and boil the said contents at full blast, adding meanwhile two or three pounds additional of the lye aforesaid to prevent the mass from boiling over and to supply the lye lost by evaporation, until the mass becomes homogeneous as to consistency throughout. While this addition of lye is made the mass must be kept constantly stirred. I then "crutch in," or, in other words, scatter in about three pounds of a solution consisting of gum-arabic, fresh ammoniacal lye, and Glauber's salt, which are compounded in the following proportions, to wit: one pint of the lye aforesaid, one pint of dissolved gum-arabic made from two ounces of gum, and one pound of Glauber's salt, and which solution must be previously heated to about 160° Fahrenheit. I then allow the mass to boil until all the ingredients are completely united and mixed and until it will shell readily when taken out and pressed between the fingers—that is, in other words, until it will adhere together, so as to be flaky if a portion is taken out of the kettle and manipulated. The mass is then ready to be poured into the frame and prepared for market as other soaps.

The soap thus compounded is a hard soap, to be put up in the form of bars and cakes and packed in boxes for transportation, and used by applying warm water thereto, as is common in using other hard soaps.

When I wish to make a soap of less consistency or hardness, and which may be used for cleaning painted or varnished surfaces without the use of water or other dilutents, I proceed as above described until the mass will shell, when, instead of pouring the mass into the frame, I add about one hundred and sixty pounds of water, ten pounds of crystal sal-soda, and two pounds of the gum solution above mentioned, keeping the whole mass heated to about 190° until the ingredients are thoroughly mixed and blended, when it is ready to be put into packages for market.

I claim as new and desire to secure by Letters Patent—

A soap made and compounded substantially as above described.

DAN. F. PACKER.

Witnesses:
WM. DEAN OVERELL,
M. M. LIVINGSTON.